United States Patent [19]

Trepanier et al.

[11] 3,919,216
[45] Nov. 11, 1975

[54] 6-(ALKYL)-3,4,6,7-TETRAHYDRO-1,2,4-TRIAZINOQUINAZOLINES

[75] Inventors: Donald L. Trepanier; Shyam Sunder, both of Midland, Mich.

[73] Assignee: The Dow Chemical Company, Midland, Mich.

[22] Filed: Nov. 4, 1974

[21] Appl. No.: 520,576

[52] U.S. Cl. .......................... 260/248 AS; 424/249
[51] Int. Cl.$^2$ .................................... C07D 253/08
[58] Field of Search .......................... 260/248 AS

[56] References Cited
UNITED STATES PATENTS 3,873,543    3/1975    Berenyi et al. ..................... 260/248

*Primary Examiner*—John M. Ford
*Attorney, Agent, or Firm*—Maynard R. Johnson

[57] ABSTRACT

Triazoloquinazoline compounds such as 3,4,6,7-tetrahydro-2-methyl-6-(isobutyl)-2H-1,2,4-triazino [4,3-c]quinazoline are prepared by the reaction of 3-(2-aminophenyl)-1-loweralkyl-1,4,5,6-tetrahydro-2H-1,2,4-triazine with an aldehyde. The compounds have pharmacological activity on the central nervous system.

5 Claims, No Drawings

6-(ALKYL)-3,4,6,7-TETRAHYDRO-1,2,4-TRIAZINOQUINAZOLINES

SUMMARY OF THE INVENTION

This invention is concerned with triazinoquinoline compounds and is particularly directed to 6-alkyl 3,4,6,7-tetrahydro-2H-1,2,4-triazino[4,3-c]quinazoline compounds of the formula

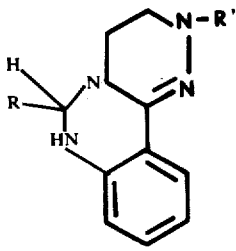

(I)

and their pharmaceutically acceptable acid addition salts. In the above formula, and elsewhere in the present specification, R represents alkyl of 1, to 2, to 3, to 4, to 5, to 6, to 7, to 8 carbon atoms, and R' represents loweralkyl of 1 to 3 carbon atoms. "Alkyl," as herein employed, refers to alicyclic alkyl moieties which are straight chain alkyl such as n-butyl, n-hexyl and n-octyl or which are branched to include one or two methyl side groups, such as isopropyl, isobutyl, and 2,4-dimethyl-n-hexyl.

The term "pharmaceutically-acceptable salt" as herein employed refers to salts which are substantially non-toxic at dosage rates consistent with good pharmacological activity. Such pharmaceutically-acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid.

The compounds are crystalline solids at ordinary temperatures. The compounds have pharmacological activity, and can be administered to animals in the study of chemical effects on the central nervous system. In particular the compound can be used as antidepressants, barbiturate potentiators or anorectic agents, as indicated by their activity in standard pharmacological evaluation procedures. The type and degree of pharmacological activity typically varies some according to such factors as specific compound employed, dosage rate, dosage route, and size, age and species of animal and effect to be produced.

For pharmacological use the compound wherein R is loweralkyl of 5 or 6 carbon atoms are preferred.

PREPARATION OF THE TRIAZOLOQUINAZOLINES

The compounds of the invention are prepared by the reaction of 3-(2-aminophenyl)-1-loweralkyl-1,4,5,6-tetrahydro-1,2,4-triazine (Formula II) with an aldehyde of Formula III to obtain the corresponding 6-alkyl-3,4,6,7-tetrahydro-2-methyl-2H-1,2,4-triazino[4,3-c] quinazoline of Formula I.

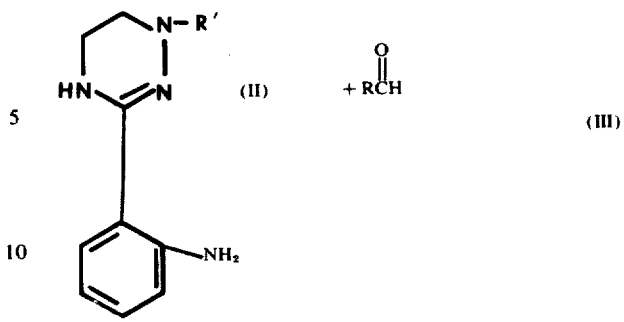

In the above formulae R and R' have the significance set out above with respect to Formula I.

The reaction of the aminophenyltriazine and the aldehyde proceeds when the reactants are contacted and mixed, in the presence of an inert organic solvent such as ethanol as a reaction medium. The reaction proceeds at temperatures from about 25° to the boiling temperature of the mixture. It is generally desirable to heat the reaction mixture to the boiling temperature under reflux. The reaction is generally complete within about 2 to about 12 hours, depending upon temperature and choice of solvent and aldehyde. The product can be separated by conventional procedures, such as evaporation of reaction medium and unreacted aldehyde, or cooling of the reaction mixture to induce crystallization of the compound, followed by filtration. The product can be purified by conventional procedures such as recrystallization and washing.

The exact proportions of the reactants to be employed are not critical, some of the desired product being obtained when the reactants are combined over a wide range of proportions. The reaction consumes the reactants in equimolar proportions and in a preferred procedure, the reactants are employed in proportions from substantially equimolar amounts of each reactant to about 10 percent molar excess of either reactant.

The pharmaceutically-acceptable salts are conveniently prepared by dissolving the free base compound in a solvent such as diethyl ether and thereafter adding an excess of a pharmaceutically-acceptable acid such as hydrochloric, hydrobromic, sulfuric, malic, maleic or p-toluenesulfonic acid or the like until precipitation of the product is complete. The product can be separated by conventional procedures such as evaporation, filtration or centrifugation and purified by conventional procedures such as recrystallization.

DESCRIPTION OF PREFERRED EMBODIMENTS

The following examples illustrate the invention but are not to be construed as limiting the same.

EXAMPLE 1

3.9 Grams of 3-(2-aminophenyl)-1-methyl-1,4,5,6-tetrahydro-1,2,4-triazine and 3 grams hexanal are dissolved in about 100 milliliters of ethanol and the mixture is stirred at room temperature for 18 hours then at the boiling temperature under reflux for about 2 hours. The ethanol is removed by evaporation; and the residue is crystallized from diethyl ether, and recrystallized from diethyl ether and ethanol. The 6-n-pentyl-2-methyl-3,4,6,7-tetrahydro2H-1,2,4-triazino[4,3-c]quinazoline product is found to melt at 101°–102°C. Elemental analysis shows carbon, hydrogen and nitrogen contents of 70.79, 8.88 and 20.39 percent, respectively, as compared to calculated contents of 70.55, 8.88 and 20.57 percent, respectively.

EXAMPLE 2

5.0 Grams (0.026 mole) of 3-(2-aminophenyl)-1-methyl-1,4,5,6-tetrahydro-1,2,4-triazine and 0.026 mole heptanal are dissolved in about 100 milliliters of ethanol and the mixture is stirred at room temperature for 18 hours then at the boiling temperature under reflux for about 2 hours. The ethanol is removed by evaporation; and the residue is crystallized from ethanol and recrystallized from diethyl ether and petroleum ether. The 6-n-hexyl-2-methyl-3,4,6,7-tetrahydro-2H-1,2,4-triazino[4,3-c]quinazoline product is found to melt at 90°–91°C. Elemental analysis confirms the named structure.

In a similar procedure, the following are prepared:
6-Isopropyl-2-methyl-3,4,6,7-tetrahydro-2H-1,2,4-triazino [4,3-c]quinazoline, melting at 128°–130°C., C,H,N, calculated: 68.8, 8.25, 22.9; found: 68.5, 8.03, 22.7, recrystallized from ethanol,
6-Methyl-2-propyl-3,4,6,7-tetrahydro-2H-1,2,4-triazino[4,3-c]quinazoline, molecular weight 244.
6-Ethyl-2-ethyl-3,4,6,7-tetrahydro-2H-1,2,4-triazino[4,3-c]quinazoline, molecular weight 244.
6-n-Butyl-2-propyl-3,4,6,7-tetrahydro-2H-1,2,4-triazino [4,3,-c]quinazoline, molecular weight 286.
6-n-Octyl-2-methyl-3,4,6,7-tetrahydro-2H-1,2,4-triazino [4,3-c]quinazoline, molecular weight 314.

In standard pharmacological evaluation procedures, (See, e.g., U.S. Pat. Nos. 3,641,019 and 3,485,921) the compound 6-n-hexyl-2-methyl-3,4,6,7-tetrahydro-2H-1,2,4-triazino[4,3-c]quinazoline is found to extend hexobarbital induced sleep in mice by a factor of at least two, when the test compound is administered intraperitoneally at 60 milligrams per kilogram 30 minutes before hexobarbital. The compound of Example 1 is found to inhibit reserpine induced ptosis in mice at an intraperitoneal dosage rate of 30 mg/kg.

The 2-aminophenyl triazine starting material can be prepared by reacting 2-aminophenyl cyanide with hydrogen sulfide in pyridine and triethylamine to obtain 2-aminophenylthiobenzamide, and then reacting the thiobenzamide with 1-methyl-1-(2-aminoethyl)hydrazine. For example, 100 grams of 2-aminophenyl cyanide in a mixture of 500–600 milliliters of pyridine and 100 milliliters triethylamine is stirred at about 25°C. while hydrogen sulfide is passed through the mixture for three hours. The product is separated, and 4 grams of the product are mixed with 1.8–2.0 grams 1-methyl-1(2-aminoethyl)hydrazine for two hours at about 100°–120°C. to drive off hydrogen sulfide of reaction, ethanol is added and the mixture is boiled for 30 minutes under reflux, cooled, diluted with ether until a precipitate forms, and filtered. The aminophenyl triazine filter cake is recrystallized from isopropanol and found to melt at 140°–141°C.

What is claimed is:
1. A 1,2,4-triazino quinazoline selected from compounds corresponding to the formula:

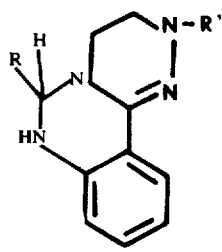

wherein R represents alkyl of one to eight carbon atoms, and R' represents loweralkyl of one to three carbon atoms and their pharmaceutically-acceptable acid addition salts.

2. A compound of claim 1 wherein R represents n-pentyl.
3. A compound of claim 2 wherein R' is methyl.
4. A compound of claim 1 wherein R is n-hexyl.
5. A compound of claim 4 wherein R' is methyl.

* * * * *